United States Patent [19]

Sounik et al.

[11] Patent Number: 5,453,483
[45] Date of Patent: Sep. 26, 1995

[54] PROCESS FOR PREPARING POLY(4-HYDROXYSTYRENE)

[75] Inventors: James R. Sounik; Graham N. Mott; Charles B. Hilton, all of Corpus Christi, Tex.

[73] Assignee: Hoechst Celanese Corporation, Somerville, N.J.

[21] Appl. No.: 406,350

[22] Filed: Mar. 17, 1995

[51] Int. Cl.[6] ...................................................... C08G 65/38
[52] U.S. Cl. ........................ 528/212; 528/214; 528/215
[58] Field of Search ...................................... 528/212, 214, 528/215

[56] References Cited

U.S. PATENT DOCUMENTS

| | | | |
|---|---|---|---|
| Re. 34,122 | 11/1992 | Sheehan et al. | 525/241 |
| 4,032,513 | 6/1977 | Fujiwara et al. | 526/141 |
| 4,880,487 | 11/1989 | Sheehan et al. | 525/241 |
| 5,264,528 | 11/1993 | Sheehan et al. | 525/384 |
| 5,342,727 | 8/1994 | Vicari et al. | 430/157 |

*Primary Examiner*—Morton Foelak
*Attorney, Agent, or Firm*—James J. Mullen; Donald R. Cassady

[57] ABSTRACT

The present invention provides a unique and novel way of producing vinyl phenols such as poly(4-hydroxystyrene) (PHS). In this new process, 4-hydroxyphenylmethylcarbinol (HPMC) is heated under suitable conditions of temperature and pressure and for a sufficient period of time to form the poly (4-hydroxystyrene) (PHS).

17 Claims, No Drawings

1

PROCESS FOR PREPARING POLY(4-HYDROXYSTYRENE)

BACKGROUND OF THE INVENTION

1. Field of the Invention

The present invention relates to a process for the production of poly(4-hydroxystyrene (PHS) directly from 4-hydroxymethylcarbinol(HPMC).

2. Description of the Prior Art

In the past, one of the ways of preparing poly(4-hydroxystyrene (PHS) was the use of 4-hydroxystyrene) (HSM) as the starting material; note European Patent Application No. 0-108-624. 4-Hydroxystyrene (HSM) is a well-known compound in the art.

Although there are several known ways to prepare 4-hydroxystyrene, these known methods are not commercially feasible in the further utilization of the 4-hydroxystyrene. The 4-hydroxystyrene itself is difficult to isolate since it ( 1 ) readily decomposes, and (2) is toxic via skin absorption and, as a result, those skilled in the art have made numerous attempts at finding a method of synthesizing PHS in a manner which avoids using the 4-hydroxystyrene as the starting material.

The following prior art references are disclosed in accordance with the terms of 37 CFR 1.56, 1.97, and 1.93.

U.S. Pat. No. 5,087,772 (issued Feb. 11, 1992) discloses the preparation of HSM by reacting 4-acetoxystyrene (ASM) with a suitable alcohol in the presence of a catalytic mount of a suitable base.

European Patent Application No. 0-128-984 (publication no.), filed Aug. 30, 1983, discloses a process for the production of para-vinyl phenol (HSM) by dehydrogenation of para-ethyl phenol.

European Patent Application No. 0-108-624 (publication no.), filed Nov. 4, 1983, discloses a process for the production of p-vinyl phenol polymer (polyhydroxystyrene polymer - PHS) by polymerizing p-vinyl phenol (HSM) in the presence of water and iron.

U.S. Pat. No. 4,032,513 (issued Jun. 28, 1977) discloses a process of producing PHS by cationically polymerizing HSM in the presence of a nitrile, such as $CH_3CN$, using a cationic polymerization initiator in a homogeneous reaction system.

Other prior art references which relate to the present invention include U.S. Pat. No. 2,276,138; U.S. Pat. No. 3,547,858; U.S. Pat. No. 4,544,704; U.S. Pat. No. 4,678,843; U.S. Pat. No. 4,689,371; U.S. Pat. No. 4,822,862; U.S. Pat. No. 4,857,601; U.S. Pat. No. 4,868,256; U.S. Pat. No. 4,877,843; U.S. Pat. No. 4,898,916; U.S. Pat. No. 4,912,173; U.S. Pat. No. 4,962,147; and U.S. Pat. No. 4,965,400.

All of the above-cited prior art and any other references mentioned herein are incorporated herein by reference in their entirety.

SUMMARY OF THE INVENTION

The present invention provides a unique and novel way of producing vinyl phenol polymers such as p-vinyl phenol polymer-poly(4-hydroxystyrene) (PHS). In this new process, the starting material is hydroxyphenylcarbinol or substituted hydroxyphenylcarbinol (herein sometimes referred to as "carbinol") such as 4-hydroxyphenylmethylcarbinol (HPMC) which is heated under suitable decomposition and polymerization conditions of temperature and pressure and for a sufficient period of time to form the PHS.

DETAILED DESCRIPTION OF THE INVENTION

It has unexpectedly been found that the PHS can be prepared by heating HPMC, with or without a diluent or solvent, for a sufficient period of time under suitable decomposition and polymerization conditions.

The process of the present invention is carried out in two steps, i.e. the first step involves a decomposition of the carbinol in which a dehydration takes place and then the polymerization follows in a second step. In this first step, the decomposition takes place at the melting point of the carbinol being used as the starting material. Generally, such temperatures are at least 100° C., preferably from about 125° C. to about 300° C. Any pressure (atmospheric, subatmospheric, and/or super atmospheric) can be used to facilitate this reaction. The reaction can be carried out with or without the use of a solvent (water or organic). The time required for this step one will vary depending, inter alia, upon the starting carbinol used and the temperature. The decomposition of the carbinol unexpectedly results in the formation of a monomer such as HSM.

In the second step (the polymerization phase of the monomer from phase [or step] one) of the present invention thus is carried out at a reaction temperature of at least 70° C., preferably between 70° C. and 300° C., and more preferably between 90° C. and 200° C. The reaction pressure may be subatmospheric, atmospheric, or super atmospheric.

The length of time which this heating (polymerization) step is conducted is not critical and the only requirement is that the heating be conducted for a period sufficient to form PHS. Generally, this period is at least five minutes and may be as long as 25 hours.

Diluents/solvents which can be used in the present invention include: (a) water; (b) hydrocarbons such as benzene, toluene, xylene, and low-boiling point petroleum fractions; (c) inorganic gases such as carbon monoxide, carbon dioxide, nitrogen, helium, and argon; (d) dipolar aprotic solvents; (e) halogenated hydrocarbons such as chloroform, trichloroethane, or chlorobenzene, etc.; (f) carbon tetrachloride; and (g) mixtures thereof. The dipolar aprotic solvents employed are solvents which have a high dielectric constant and a high dipole moment but no acid hydrogen atoms; for example, such solvents include dimethylsulfoxide (DMSO), acetonitfile, dimethylformamide (DMF), dimethylacetamide, hexamethylphosphoric acid triamide (HMPT), and n-methyl pyrrolidone (NMP). Solvents such as ethanol, methanol, or tetrahydrofuron (THF) may be used in combinations with the preceding solvents/diluents. Water, benzene, and toluene are preferred diluents. The diluents are used in an amount of 2 to 200 mols, preferably 3 to 20 mols per mol of HPMC. It is to be understood that any diluent may be used under any temperature and reaction conditions so long as the polymerization of HPMC is effected smoothly.

In carrying out the present invention, the amount of water, if present, in the reaction system is generally used in the range of 10 to 300% by weight, preferably 20 to 200% by weight, and more preferably, 50 to 100% by weight, based on the amount of HPMC.

It is also within the scope of the present invention to employ polymerization inhibitors or accelerators in order to facilitate the reaction. Any substance may be used as the polymerization accelerator in the present invention if it accelerates or initiates polymerization of HPMC. For example, it is possible to use various polymerization accelerators described in Japanese Patent Publication (examined) Nos. 30123/82 and 47921/82 and Japanese Patent Publication (unexamined) Nos. 44607/82, 44608/82, and 44609/82, etc., all of which are incorporated herein by reference in their entirety.

Specific examples of the polymerization accelerators useful in the present invention include (1) cation initiators, e.g., (a) inorganic acids such as sulfuric acid, hydrochloric acid, nitric acid, or phosphoric acid, etc.; (b) metal halides such as aluminum chloride, tin tetrachloride, iron chloride, vanadium oxychloride, or boron trifluoride, etc.; (c) complexes such as ether complex of boron trifluoride or phenol complex of boron trifluoride, etc.; (d) aliphatic saturated monocarboxylic acids such as formic acid, acetic acid, chloroacetic acid, dichloro- acetic acid, trichloroacetic acid, fluoroacetic acid, bromoacetic acid, idoacetic acid, trichloroacetic acid, oxyacmethoxyacetic acid, mercaptoacetic acid, cyanoacetic acid, propionic acid, 2-oxy-propionic acid, n-butyric acid, isobutyric acid, n-valerie acid, isovaleric acid, 4-keto-n-valeric acid, methylethylacetic acid, trimethylacetic acid, caproic acid, heptoic acid, caprylic acid, pelargonic acid, or capric acid, etc.; (e) aliphatic saturated polycarboxylic acids such as oxalic acid, malonic acid, succinic acid, glutaric acid, adipic acid, pimelic acid, tartaric acid, polyacrylic acid, or citric acid, etc.; (f) aliphatic unsaturated monocarboxylic acids such as acrylic acid, crotonic acid, or methacrylic acid, etc.; (g) aliphatic unsaturated polycarboxylic acids such as maleic acid or fumaric acid, etc.; (h) aromatic carboxylic acids such as benzoic acid, hydroxybenzoic acid, methoxybenzoic acid, chlorobenzoic acid, bromobenzoic acid, iodobenzoic acid, cinnamic acid, salicylic acid, toluic acid, phthalic acid, isophthalic acid, terephthalic acid, trimellitic acid, or pyromellitic acid, etc.; or (i) organic sulfonic acids such as methanesulfonic acid; ethane- sulfonic acid, benzenesulfonic acid or toluenesulfonic acid, etc.; and (2) radical initiators, e.g., azoisobutyronitrile, benzoyl peroxide, or ammonium persulfate, etc.

Phenol complex of boron trifluoride, sulfuric acid, hydrochloric acid, oxalic acid, phosphoric acid, chloroacetic acid, bromoacetic acid, benzenesulfonic acid, and toluenesulfonic acid are preferred polymerization accelerators.

The amount of these polymerization accelerators used varies according to the kind thereof, reacting conditions to be adopted and desired molecular weight of the polymer, etc. However, the amount is generally preferred to be in the range of 0.005 to 10% by weight based on the amount of the HPMC.

It is also within the scope of the present invention processes to use a catalyst in order to further facilitate the polymerization reaction. Such catalysts include, without limitation, acids and bases such as $H_2SO_4$, $H_3PO_4$, NaOH, etc. The amount of catalyst employed is any amount which will facilitate the reaction. Such amount will generally be from about 0.001% by weight to about 2.0% by weight based on the total weight of HPMC employed.

After the polymerization of HPMC, the end product (PHS) is recovered from the reaction product and the residual fraction containing any unreacted HPMC can be recycled as the starting material for the next cycle. The end product (PHS) may be recovered from the reaction product by any method; for example, it can be separated from the fraction containing the unreacted HPMC by filtration or any other suitable technique.

The following specific example is supplied for the purpose of better illustrating the invention. This example is not intended, however, to limit or restrict the scope of the invention in any way and should not be construed as providing conditions, parameters, or values which must be utilized exclusively in order to practice the present invention.

EXAMPLES 1–6

Preparation of Poly(4-Hydroxystryrene (PHS) from 4-Hydroxyphenylmethylcarbinol (HPMC)

Example 1

A 500 ml three neck flask was fitted with a dean stark trap with condenser, mechanical stirrer, and a nitrogen inlet. To the flask was added 4-hydroxyphenylmethylcarbinol (34.14 g, 0.25 moles) and the flask was thoroughly purged with nitrogen. The solid was heated to 150° C. with an oil bath for 15 hours. During this time, the solid became a melt and water was released The melt solidified upon cooling to room temperature and the solid was dissolved in methanol (100 g). The solution was precipitated into water (800 ml) and the solid was isolated by filtration, washed with water (100 ml), dried (25° C., 100 tom), and weighed (26.0 g, 0.22 moles, 87%).

The poly(hydroxystyrene) obtained was soluble in polar organic solvents such as acetone, methanol, tetrahydrofuran, etc. The $\bar{M}_m$ was 2025 and the $\bar{M}_n$ was 1328, and the a $\bar{M}_m/\bar{M}_n$ was 1.53 respectively.

Example 2

The same procedure as in Example 1 except phosphoric acid (0.13 g) was used as a dehydration and polymerization catalyst, with 4-hydroxyphenylmethylcarbinol (32 g, 0.23 moles) and the reaction time was twenty hours. The polymer was isolated in a similar manner giving a yield of 81%, a $\bar{M}_m$ of 3324, a $\bar{M}_n$ of 1819, and a $\bar{M}_m/\bar{M}_n$ of 1.83.

Example 3

The same procedure as in Example 2 except VA-086 (2,2'-azobis[2-methyl-N-(2hydroxyethyl)propionamide] Wako Chemicals) (0.13 g) was used as a radical initiator, with 4-hydroxyphenylmethylcarbinol (32.3 g, 0.24 moles) with a reaction time of 22.5 hours. The polymer was isolated in a similar manner giving a yield of 85%, a $\bar{M}_m$ of 2255, a $\bar{M}_n$ of 1420, and a $\bar{M}_m/\bar{M}_n$ of 1.59.

Example 4

To a 100 cc autoclave, 4-hydroxyphenylmethylcarbinol (4.4 g, 0.03 moles) and water ( 17.6 g) were added. The reactor was thoroughly purged with nitrogen. The mixture was heated to 150° C. for 16 hours. The maximum pressure attained during this time was 170 psi. The reactor was cooled to 40° C., vented, and purged with nitrogen. The liquid layer was decanted and the remaining solid was dissolved in methanol (11.7 g). The solution was then precipitated into water (150 ml). The solid was isolated by filtration and washed with water (100 ml), dried (25° C., 100 torr.), and weighed (3.28 g, 0.03 moles, 85%).

The poly(hydroxystyrene) obtained was soluble in polar organic solvents such as acetone, methanol, tetrahydrofuran, etc. The $\bar{M}_m$ weight was 2412 and the $\bar{M}_n$ was 1443, and the $\bar{M}_m/\bar{M}_n$ was 1.67 respectively.

Example 5

The same procedure as in Example 2 except polyacrylic acid (1.0 g, 25% PAA in water) was used as a suspension aid and catalyst, with 4-hydroxyphenylmethylcarbinol (9.98 g, 0.07 moles), and water (30.6 g), and the reaction time was 15.5 hours. The maximum pressure attained during this time was 175 psi. The polymer was isolated in a similar manner giving a yield of 78%, a $\bar{M}_m$ of 4250, a $\bar{M}_n$ of 2428, and a $\bar{M}_m/\bar{M}_n$ of 1.86.

Example 6

The same procedure as in Example 1 except stearic acid (1.0 g) was used as a suspension aid, with g-aminoethylphenol (20.4 g, 0.15 moles), and water (60.9 g). The polymer was isolated in a similar manner giving a yield of 81%, a $\bar{M}_m$ of 1224, a $\bar{M}_n$ of 817, and a $\bar{M}_m/\bar{M}_n$ of 1.50.

Although the invention has been illustrated by the preceding examples, it is not to be construed as being limited thereby; but rather, the invention encompasses the generic area as hereinbefore disclosed. Various modifications and embodiments can be made without departing from the spirit and scope thereof.

What is claimed is:

1. A process for preparing polyhydroxystyrene which comprises the steps of heating 4-hydroxyphenylmethylcarbinol under suitable conditions of temperature and pressure and for a sufficient period of time to form said polyhydroxystyrene.

2. The process as set forth in claim 1 wherein the temperature is at least about 70° C.

3. The process as set forth in claim 1 wherein the reaction takes place in the presence of an organic solvent.

4. The process as set forth in claim 1 wherein the reaction takes place in the presence of water.

5. The process as set forth in claim 1 wherein the reaction takes place in the presence of a solvent which is a mixture of an organic solvent and water.

6. The process as set forth in claim 4 wherein the reaction takes place in the presence of an initiator.

7. The process as set forth in claim 6 wherein the reaction takes place in the presence of a catalyst.

8. The process as set forth in claim 7 wherein the reaction takes place in the presence of a suspension aid.

9. A process for the production of p-vinylphenol polymer which comprises decomposing followed by polymerizing 4-hydroxyphenylmethylcarbinol in the presence of a polymerization accelerator; wherein said polymerization is additionally carded out in the presence of water.

10. The process as set forth in claim 1 wherein the amount of water present is 10 to 300% by weight based on the amount of 4-hydroxyphenylmethylcarbinol.

11. The process as set forth in claim 9 wherein the polymerization accelerator is selected from the group consisting of at least one cationic initiator selected from inorganic acids, metal halides, complexes of boron trifluoride, aliphatic saturated monocarboxylic acids, aliphatic saturated polycarboxylic acids, aliphatic unsaturated monocarboxylic acids, aliphatic unsaturated polycarboxylic acids, aromatic carboxylic acids, and organic sulfonic acids.

12. The process as set forth in claim 9 wherein the polymerization accelerator is selected from the group consisting of at least one radical initiator selected from azoisobutyronitrile, benzoyl peroxide, and ammonium persulfate.

13. The process as set forth in claim 12 wherein the amount of the polymerization accelerator present is from about 0.005 to about 10% by weight based on the amount of 4-hydroxyphenylmethylcarbinol.

14. The process as set forth in claim 13 wherein the polymerization reaction temperature is from about 70° C. to about 300° C.

15. The process as set forth in claim 1 wherein a hydroxyphenylcarbinol is substituted for 4-hydroxyphenylmethylcarbinol.

16. The process as set forth in claim 1 wherein a substituted hydroxyphenylcarbinol is substituted for 4-hydroxyphenylmethylcarbinol.

17. A process for preparing a polyhydroxystyrene which comprises the step of heating a substituted hydroxyphenylcarbinol under suitable conditions of temperature and pressure and for a sufficient period of time to form said polyhydroxystyrene.

* * * * *